United States Patent
Huang et al.

(10) Patent No.: US 9,272,940 B2
(45) Date of Patent: Mar. 1, 2016

(54) ION TRANSPORT MEMBRANES IN FLOAT GLASS MANUFACTURING

(71) Applicant: Air Liquide, Societe Anonyme pour Etude et Exploitation des Procedes Georges Claude, Paris (FR)

(72) Inventors: Wei Huang, Newark, DE (US); Youssef Joumani, Houston, TX (US); Remi Pierre Tsiava, Houston, TX (US); Bhadra S. Grover, Sugar Land, TX (US)

(73) Assignee: L'Air Liquid Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 166 days.

(21) Appl. No.: 14/141,772

(22) Filed: Dec. 27, 2013

(65) Prior Publication Data

US 2015/0183675 A1    Jul. 2, 2015

(51) Int. Cl.
| | |
|---|---|
| *C03B 18/20* | (2006.01) |
| *C03B 5/235* | (2006.01) |
| *C03B 5/237* | (2006.01) |
| *B01D 53/22* | (2006.01) |

(52) U.S. Cl.
CPC .............. *C03B 18/20* (2013.01); *B01D 53/228* (2013.01); *C03B 5/237* (2013.01); *C03B 5/2353* (2013.01); *B01D 2053/221* (2013.01)

(58) Field of Classification Search
CPC ........ C03B 18/20; C03B 5/2353; C03B 5/237
See application file for complete search history.

(56) References Cited

U.S. PATENT DOCUMENTS

| | | | |
|---|---|---|---|
| 5,753,007 A * | 5/1998 | Russek | B01D 53/22 95/130 |
| 5,888,265 A * | 3/1999 | Bonaquist | C03B 5/2353 65/157 |
| 6,783,750 B2 | 8/2004 | Shah et al. | |
| 8,268,041 B2 | 9/2012 | Ekiner et al. | |
| 2012/0135363 A1 * | 5/2012 | Bioul | C01B 13/0255 432/180 |

FOREIGN PATENT DOCUMENTS

WO    2011015616 A1    2/2011

* cited by examiner

*Primary Examiner* — Queenie Dehghan
(74) *Attorney, Agent, or Firm* — Christopher J. Cronin

(57) ABSTRACT

An ion transport membrane, a heat exchanger, and a recuperator are integrated with a float glass manufacturing process. Only feeds of fuel and air are necessary for producing hot oxygen for a melting furnace and a nitrogen-enriched stream to a float bath. The oxygen and nitrogen are produced on-site without requiring cryogenic distillation.

3 Claims, 1 Drawing Sheet

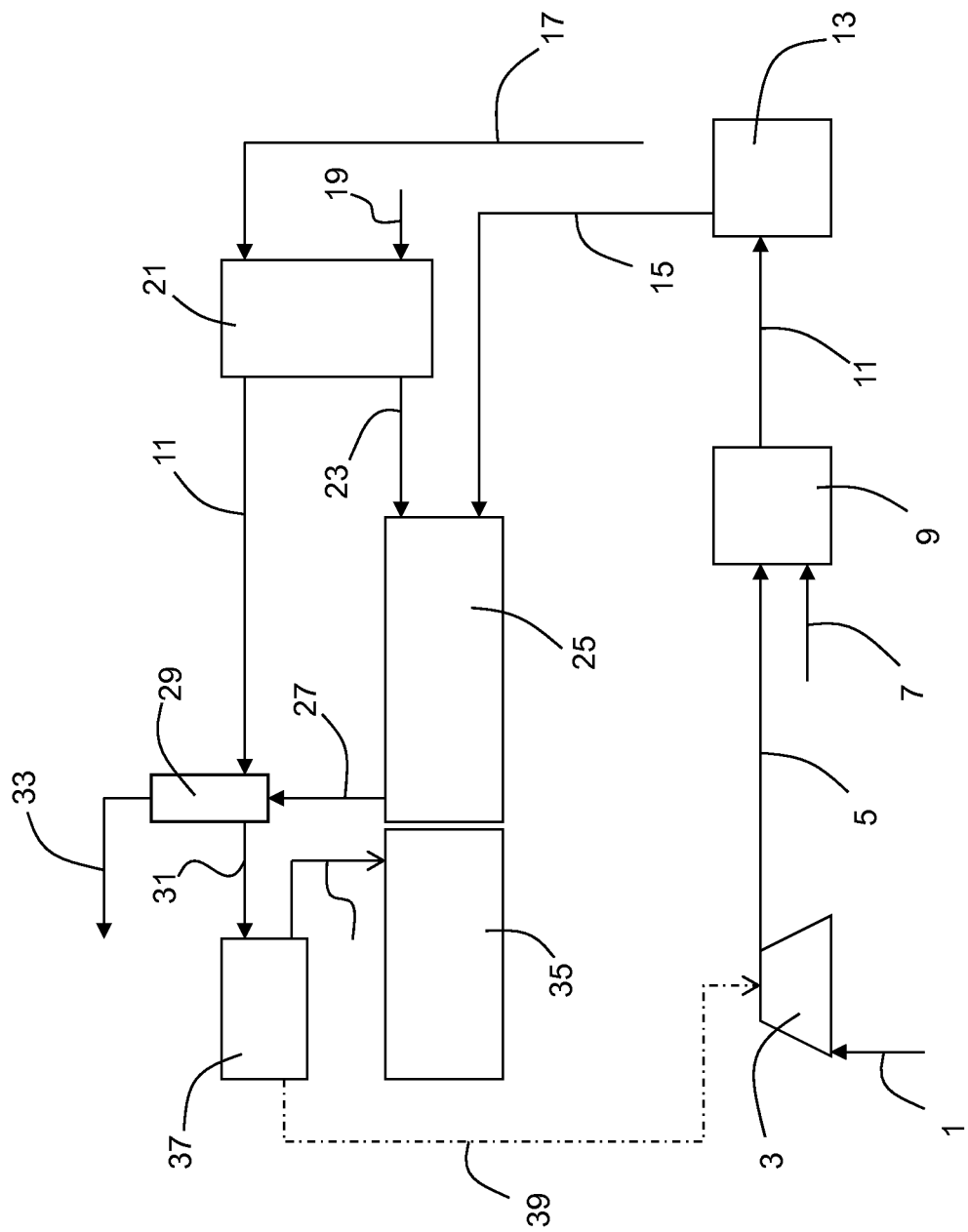

ION TRANSPORT MEMBRANES IN FLOAT GLASS MANUFACTURING

CROSS-REFERENCE TO RELATED APPLICATIONS

None.

BACKGROUND

1. Field of the invention

The present invention relates to ion transport membranes and float glass furnaces.

2. Related art

Nowadays, the glass industry can be divided into four product segments: Flat glass (windows, automobile windshields, and picture glass); Container glass (bottles, jars, and packaging); Glass fiber (insulation/fiberglass, textile fibers for material reinforcement, and optical fibers); and Specialty glasses (pressed/blown glass such as table and ovenware, flat panel display glass, light bulbs, television tubes, and scientific and medical applications.

Glass manufacture, regardless of the final product, requires four major processing steps: batch preparation, melting and refining, forming, and post forming. Batch preparation is the step where the raw materials for glass are blended to achieve the desired final glass product. While the main components in glass are high-quality sand (silica), limestone, and soda ash, there are many other components that can be added. The details of the batch material are well known in the art and need not be discussed here. Once the mixed batch is charged to a melting furnace, melting of the batch may be accomplished in many different types and sizes of furnaces, depending upon the quantity and type of glass to be produced. The melting step is complete once the glass is free of any crystalline materials. Refining (also referred to as fining) is the combined physical and chemical process occurring in the melting chamber during which the batch and molten glass are freed of bubbles, homogenized, and heat conditioned. After refining, the molten glass is sent to forming operations. Forming is the step in which the final product begins to take shape, and may involve casting, blow forming, sheet forming, fiberization, or other processes. Forming processes vary widely, depending on the type of glass being manufactured. Some products require post-reforming procedures, which vary widely depending upon the products. The post-reforming procedures may include processes that alter the properties of the glass, such as annealing, tempering, laminating and coating.

To make glass, one necessary condition is to supply high-temperature energy to the process. This can be done by flames generated through burners installed above the glass bath or electrically by using electrodes submerged in the glass bath. Flames of course result from the combustion of a fuel (such as natural gas, oil, or coal) and an oxidant (such as air, oxygen-enriched air, or high purity oxygen). Most glass furnaces use air as an oxidant. In some conditions, high purity oxygen is preferred despite the extra cost due to the oxygen price. Reducing pollutants emissions (such as NOx, Sox) or greenhouse gases ($CO_2$), fuel consumption, and capital investment are typical advantages associated with the use of high purity oxygen.

In the industrial gas industry, large amounts of oxygen are typically supplied by one of our methods: bulk liquid tanks which are filled regularly by bulk liquid trucks, vacuum swing adsorption (VSA) which provides low purity oxygen at low pressure, an oxygen pipeline, or a dedicated air separation unit. Supply by bulk liquid tanks is not practice for furnace powers higher than 2 MW (≈7 MMBtu/hr) due to the sheer number of truck deliveries needed. It should be noted that flat glass furnaces are operated usually at 35 MW. VSAs are limited in capacity (10 MW is maximum allowable level). While oxygen pipelines are ordinarily considered the most appropriate, their application to glass furnaces is limited to where they are located. Additionally, the risk of pipeline failure is always taken into account. Finally, a dedicated ASU is ordinarily considered an oversized solution for 35 MW glass furnaces.

Some have proposed to reduce the fuel and/or oxygen requirements of glass furnaces by preheating air or oxygen. In air-fired furnaces, flue gases are used to preheat air to 600° C. (1100° F.) or up to 1250° C. (2300° F.). In oxy-fired furnaces, such a technique is difficult to implement because pure oxygen is a very hazardous material and ignition of a mixture with oxygen can jeopardize the furnace. One particular solution from Air Liquide involves the preheating of oxygen and natural gas with hot flue gas via an intermediate heat exchange fluid of air. In this manner, oxygen may be preheated to 550° C. and natural gas to 450° C. Fuel savings of about 10% can be realized with implementation of this technology.

Some glassmakers and engineering companies sells boilers and power station using the fumes energy but the yield is still too low to be really profitable.

Another way of producing oxygen on-site that has not yet been commercially implemented is the use of high temperature ion transport membranes (ITMs). ITMs are particular types of solid electrolytes that are inorganic crystalline materials that, while being impermeable to gases, have the property of conducting oxygen ions ($O^{2-}$) or protons ($H^+$) through vacancies in its crystalline structure. In order to maintain electric charge neutrality, certain solid electrolyte membranes must include a separate electron-conductive path. Ones that conduct oxygen ions are called oxygen transport membranes while ones that conduct protons are called hydrogen transport membranes. Other solid electrolyte membranes are made of materials that, at elevated temperatures, can simultaneously conduct oxygen ions and electrons or simultaneously conduct protons and electrons. Examples of these oxygen ion conductive materials include certain perovskites such as $La_xSr_{1-x}CoO_{3-y}$, $La_xSr_{1-x}FeO_{3-y}$, and $La_xSr_{1-x}Fe_yCo_{1-y}O_{3-z}$ are examples of mixed conductors. One example of a proton conductive material is a cermet, a composite of metal and sintered ceramic. Other examples of proton conductive materials include the single-phase mixed metal oxide materials of the formula: $AB_{1-x}B'_xO_{3-y}$, wherein A is selected from Ca, Sr or Ba ions, B is selected from Ce, Zr, Ti, Tb, Pr, or Th ions, B' is selected from Yb, In, Ru, Nd, Sc, Y, Eu, Ca, La, Sm, Ho, Tm, Gd, Er, Zr, Gb, Rh,Ti, V, Cr, Mn, Fe, Co, Ni, Cu, Al, Ga, or In ions (or combinations thereof), x is greater than or equal to 0.02 and less than or equal to 0.5, and y is such that the electrical neutrality of the crystal lattice is preserved. These oxygen ion or proton conductive membranes are often called mixed oxide conducting membranes.

Other terms used to describe these membranes include mixed ion and electron(ic) conducting membranes, mixed proton and electron(ic) conducting membranes, ion transport membranes, oxygen transport membranes, hydrogen transport membranes, solid state membranes, mixed conducting metallic oxide, and mixed conducting multicomponent metallic oxide membranes. Regardless of the name utilized, these materials have the ability to transport oxygen ions ($O^{2-}$) or protons ($H^+$) through their crystalline structure.

Using oxygen conductive mixed oxide conducting membranes as an example, at elevated temperatures, the mixed oxide conducting material contains mobile oxygen ion vacancies that provide conduction sites for transport of oxygen ions through the material. The membrane is in part driven by a difference in oxygen partial pressure across the membrane. When the surface of the membrane is exposed to the relatively higher $O_2$ partial pressure gaseous atmosphere, the molecular oxygen in the gaseous atmosphere adjacent the surface reacts with electrons and the oxygen vacancies in the crystalline structure of the material to product oxygen ions $O^{2-}$. The oxygen anions diffuse through the mixed conductor material to the opposite surface of the membrane which is exposed to the relatively lower $O_2$ partial pressure. At the opposite surface, the oxygen anions give up their electrons and form molecular oxygen. The molecular oxygen then diffuses into the gaseous atmosphere adjacent the surface of the membrane exposed to the lower $O_2$ partial pressure gaseous atmosphere. These materials transport oxygen ions selectively, and assuming a defect-free membrane and lack of interconnecting pores, they can act as a membrane with an infinite selectivity for oxygen.

Proton conductive mixed oxide conducting membranes operate in much the same way and are similarly in part driven by a difference in hydrogen partial pressure across the membrane. When the surface of the membrane is exposed to the relatively higher $H_2$ partial pressure gaseous atmosphere, hydrogen molecules disassociate into protons and electrons which migrate through the membrane to the opposite surface where they recombine into hydrogen molecules. The thus-formed hydrogen molecules then diffuse into the gaseous atmosphere adjacent the membrane surface. Similar to oxygen conducting mixed oxide conducting membranes, these proton conducting membranes offer the possibility of infinite selectivity for hydrogen.

In oxygen transport membranes, air is compressed to about 16 bars, heated to 900° C., and fed to the ITM and hot oxygen permeates through the membrane. The permeate pressure must be kept low in order to provide the necessary oxygen partial pressure driving force across the membrane. A recovery of 50% to 80% of the oxygen in the air is considered feasible. ITMs can thus provide oxygen at a temperature of around 900° C. and at a low pressure ranging from 0.5 bara to 2 bara. The product oxygen can be withdrawn at different pressures, such as 0.5 bara, 0.7 bara, 1.1 bara, or 2.2 bara in order to minimize recompression energy. Oxygen produced at high temperature and low pressure does not require further preheating and is suitable for use in the glass furnace. In addition to the product oxygen, a hot non-permeate gas containing nitrogen and non-recovered oxygen is available at 900° C. and 16 bars. The use of the non-permeate gas is a challenge since it may drag the efficiency down if not treated properly.

In flat glass furnaces, melted glass exits the glass bath at around 1100° C. (2220° F.). At one meter wide and ten centimeters thick, the melted glass flows on top of a tin bath. At this temperature, the tin reacts in presence of $O_2$ in the atmosphere to produce SnO vapor. Because of high levels of SnO equilibrium vapor, a significant quantity of SnO can be formed through condensation of the SnO vapor at the cold spots in the roof. This solid condensate falls down on the glass when it grows to a certain size and mechanically damages the glass. Thus a reductive atmosphere is typically used in order to protect the Sn from oxidation. The atmosphere above the tin bath is ordinarily composed of 90% $N_2$ and about 10% $H_2$. About 1000 $Nm^3/h$ of $N_2$ and 100 $Nm^3/h$ of $H_2$ are needed to fulfill the space above the glass. Such high quantities are usually provided by pipe.

While each of the above technologies is interesting in its own right, glass manufacturers utilizing float glass furnaces still strive to reduce costs. Thus, there is a need to provide a new technology which preserves the above advantages while driving down costs.

SUMMARY OF THE INVENTION

There is provided a method for producing float glass that includes the following steps. Air is compressed with a compressor. Gaseous fuel and an excess of the compressed air are fed to a combustor. The compressed air and fuel are combusted at the combustor to produce a stream of air-enriched products of combustion. The stream of air-enriched products of combustion is fed to an ion transport membrane to produce a permeate stream of pure oxygen and a permeate stream comprising nitrogen-enriched products of combustion. A stream of fuel is heated through heat exchange with the non-permeate stream at a heat exchanger. The permeate stream and the heated stream of fuel are combusted in a glass melting furnace to produce hot flue gas. The non-permeate stream is heated through heat exchange with the hot flue gas at a recuperator. The residue stream is fed above a float glass bath.

There is also provided a system for producing float glass, comprising: a compressor adapted and configured to compress air; a combustor adapted and configured to combust a stream of gaseous fuel and the compressed air from the compressor to produce a hot stream of air-enriched products of combustion; an ion transport membrane adapted and configured to receive the hot stream of air-enriched products of combustion and produce a hot permeate stream of pure oxygen and a hot non-permeate stream comprising nitrogen-enriched products of combustion; a heat exchanger adapted and configured to heat a stream of gaseous fuel and cool the hot non-permeate stream; a glass-melting furnace adapted and configured to combust the hot permeate stream and the heated stream of gaseous fuel and produce hot flue gas; a recuperator adapted and configured to heat the non-permeate stream coming from the heat exchanger and cool the hot flue gas; and a tin float glass bath adapted and configured to receive the non-permeate stream originating from the recuperator.

The method and/or system may include one or more of the following aspects:
- the residue stream is first cooled at a waste heat boiler before it is fed above the float glass bath.
- the air is compressed with the compressor using power produced by the waste heat boiler.
- a waste heat boiler receives the non-permeate stream from the recuperator, wherein the tin float glass bath receives the non-permeate stream from the waste heat boiler.
- the waste heat boiler and the compressor are coupled so that power produced by the waste heat boiler is provided to the compressor.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

The Figure is a schematic of the inventive method/system.

DETAILED DESCRIPTION

One of our goals is to provide a low-NOx oxy-fuel furnace using the same amount of fuel that is used by an air-fired furnace for a given level of glass production. Another of our goals is to provide on-site production of $O_2$ and $N_2$. Yet another goal is to provide on-site production of $O_2$ and $N_2$ for use in a flat glass manufacturing process without requiring an external source of electricity for compression of air. Still another goal is to provide on-site production of $O_2$ and $N_2$ for use in a flat glass manufacturing process without requiring cryogenic distillation. Still yet another goal is to provide on-site production of an $N_2$-containing inerting gas for a float glass bath. Our invention combines a heat recovery system with an on-site $N_2$ and $O_2$ production system for achievement of each of these goals.

In this invention, we are focusing on the integration of an ITM in the flat glass manufacturing process. An ITM is a potential $O_2$-supplying unit for the oxy-combustion burners in the glass melting furnace as the resultant low pressure, hot $O_2$ is particularly suitable as an oxidant. In this way, direct use of the hot $O_2$ product from the ITM increases the energy efficiency of the glass manufacture process. The ITM also generates large amounts of a hot, high pressure non-permeate stream containing $CO_2/N_2/H_2O$. In this invention, we also use the non-permeate stream in the production of float glass.

Oxygen transport membranes are well known in the art and different materials are available for use in them to produce streams of pure oxygen or for use as syngas reactors as described in U.S. Pat. No. 8,268,041, the contents of which are disclosed herein in their entirety. While U.S. Pat. No. 8,278,041 focuses upon ITMs made of hollow fibers, the ITMs of the invention can be of any configuration known in the art.

As best illustrated in the FIG, a stream of air 1 (at a pressure and temperature, for example, of 1 bar and 25° C.) is compressed at a compressor 3 to provide a stream of compressed air 5 (at a pressure and temperature, for example, of 15 bar and 25° C.). The stream of compressed air 5 is combusted with a stream of fuel 7 (at a pressure of, for example, of 15 bar and 25° C.) at a combustor 9.

The flow rates of the fuel and air stream 5, 7 are selected so as to provide an excess of air. This will produce a stream of hot air-enriched combustion products 11 at a pressure and temperature, for example, of 15 bar and 900° C. The predominant gases in stream 11 are $O_2$ and $N_2$ with lesser amounts of $CO_2$ and $H_2O$.

An ITM 13 receives the stream of hot air-enriched combustion products 11 and separates it into a permeate stream of hot, pure oxygen 15 and a non-permeate stream of hot $N_2$-enriched combustion products 17. Because it has been depleted of $O_2$, the stream of hot $N_2$-enriched combustion products 17 predominantly contains $N_2$ with lesser amounts of $CO_2$ and $H_2O$. It remains at a temperature, for example, of 900° C.

A stream of gaseous fuel 19 (at a pressure and temperature, for example, of 0.5 bar and 25° C.) is preheated through heat exchange with the hot non-permeate stream 17 at a heat exchanger 21 to a temperature, for example, of up to 900° C.). While the fuel may be any gaseous hydrocarbon, it is typically natural gas. The resulting stream of preheated fuel 23 is combusted at burners of a glass melting furnace 25 with oxygen from the hot permeate stream 15. The furnace 25 produces a stream of hot flue gases 27 at a temperature, for example, of 1,200° C.

The cooled non-permeate stream 17 exits the heat exchanger 21 at a temperature, for example, of 680° C. and is directed to a recuperative heat exchanger 29 where it is heated through heat exchange with the stream of hot flue gases 27 to provide a heated non-permeate stream 31 at a temperature, for example, of 800° C. The now-cooled flue gases 33 are vented at a temperature, for example, of 800° C.

While the heated non-permeate stream 31 may optionally be introduced above a float glass bath 35 after drying, it is typically first introduced into a waste heat boiler 37. In such a case, the stream 31 is cooled at the waste heat boiler and dried to provide a cooled stream of $N_2$ (containing minor amounts of $CO_2$) at a temperature, for example, as low as 25° C. Power (either electrical or mechanical) 39 produced by the waste heat boiler 37 may be advantageously provided to the compressor 3 by coupling the waste heat boiler 37 with the compressor 3.

In the foregoing manner, a low NOx glass furnace of a flat glass manufacturing process is provided along with on-site production of O2 and N2 without requiring external sources of electricity, without requiring a cryogenic distillation system, and without requiring additional fuel above and beyond that required in an air-fired glass furnace for a given level of glass production.

Prophetic Example

The inventive method and system is based on a coupling between a heat exchanger and an ITM. For a 600 tpd furnace, 6000 $Nm^3/h$ of $O_2$ are necessary. By introducing 1900 $Nm^3/h$ of NG and 47500 $Nm^3/h$ of air into the inventive method and system, a stream of flue gases at 930° C. containing 6005 $Nm^3/h$ are produced. The sensible energy of the flue gas equals 18.5 MW. Assuming a 100% pure oxygen permeate stream is produced at the ITM, the $CO_2/N_2/H_2O$ non-permeate stream may contain up to 16 MW.

At a natural gas heat exchanger, 2 MW from the non-permeate stream are necessary to preheat 3000 Nm3/h of NG at 900° C. Assuming about 5% of heat losses from the hot flow, 0.8 MW goes by conduction through the walls of the heat exchanger walls. At the outlet of the natural gas heat exchanger, the $CO_2/N_2/H_2O$ non-permeate stream still contains 13 MW, corresponding to a temperature of 680° C. To preheat these gases to 800° C., 2.8 MW are extracted from the flue gases (produced by the glass furnace) at a recuperative heat exchanger. Because the flue gases are at 1200° C., they contains 12 MW and therefore a sufficient amount of thermal energy for heating the $CO_2/N_2/H_2O$ non-permeate gas stream to a satisfactory temperature.

By recovering heat from the 15.6 MW $CO_2/N_2/H_2O$ stream at a waste heat boiler, the energy necessary to compress the 47500 Nm3/h of air at 16 bars can optionally be provided by mechanically or electrically coupling the waste heat boiler with the compressor. The $CO_2/N_2/H_2O$ is then dried at 25° C. and the resultant $CO_2/N_2$ gas stream is introduced in the tin bath chamber at some mbars.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method for producing float glass, comprising:
   compressing air with a compressor;
   feeding gaseous fuel and an excess of the compressed air to a combustor;
   combusting the compressed air and fuel at the combustor to produce a stream of air-enriched products of combustion;
   feeding the stream of air-enriched products of combustion to an ion transport membrane to produce a permeate stream of pure oxygen and a non-permeate stream comprising nitrogen-enriched products of combustion;

heating a stream of fuel through heat exchange with the non-permeate stream at a heat exchanger; and combusting the permeate stream and the heated stream of fuel in a glass melting furnace to produce hot flue gas;

heating the non-permeate stream through heat exchange with the hot flue gas at a recuperator; and feeding the non-permeate stream above a float glass bath.

2. The method of claim 1, wherein the non-permeate stream is first cooled at a waste heat boiler before it is fed above the float glass bath.

3. The method of claim 2, further comprising the step of compressing the air with the compressor using power produced by the waste heat boiler.

* * * * *